United States Patent [19]

Ikeda et al.

[11] Patent Number: 5,223,774
[45] Date of Patent: Jun. 29, 1993

[54] METHOD FOR CONTROLLING SPEED OF A MOTOR OF A CARD READER

[75] Inventors: Masahiro Ikeda; Hideo Usuki, both of Shimosuwa, Japan

[73] Assignee: Sankyo Seiki Mfg. Co., Ltd., Nagano, Japan

[21] Appl. No.: 964,564

[22] Filed: Oct. 21, 1992

Related U.S. Application Data

[63] Continuation of Ser. No. 616,057, Nov. 20, 1990, abandoned.

[30] Foreign Application Priority Data

Nov. 20, 1989 [JP] Japan .................. 1-301420

[51] Int. Cl.⁵ .................................... H02P 7/00
[52] U.S. Cl. .................. 318/268; 388/904; 388/907.5
[58] Field of Search .......... 318/268, 273, 276, 59, 318/61, 90, 599, 606, 616, 618, 561, 571, 799–812; 388/809, 811, 812, 817, 904, 907.5, 912

[56] References Cited

U.S. PATENT DOCUMENTS

| | | | |
|---|---|---|---|
| 4,243,921 | 1/1981 | Tamura et al. | 318/608 X |
| 4,463,435 | 7/1984 | Cavill | 318/599 X |
| 4,506,321 | 3/1985 | Comstock et al. | 318/561 X |
| 4,513,381 | 4/1985 | Houser, Jr. et al. | 318/571 X |
| 4,656,572 | 4/1987 | Caputo et al. | 318/811 X |
| 4,827,148 | 5/1989 | Hirosawa et al. | 318/4 X |
| 4,838,037 | 6/1989 | Wood | 318/599 X |
| 4,899,234 | 2/1990 | Genheimer | 318/561 X |
| 4,959,602 | 9/1990 | Scott et al. | 318/803 |

FOREIGN PATENT DOCUMENTS 222679 9/1989 Japan .................. 318/599

Primary Examiner—Jonathan Wysocki
Attorney, Agent, or Firm—McAulay Fisher Nissen Goldberg & Kiel

[57] ABSTRACT

A method for controlling a speed of a motor includes the steps of setting an upper limit threshold level for the thresholding at an upper limit value of the set speed range and a lower limit threshold level for the thresholding at a lower limit value of the set range speed, providing a signal based on a parameter table having a plurality of different duty factors for stepwisely adjusting the speed of the motor so that, when the speed of the motor exceeds the upper limit value, an input of the motor is switched to a signal of a lower rank of duty factor within the parameter table, whereas when the speed of the motor lowers to a speed below the lower limit value, an input of the motor is switched to a signal having a higher rank of duty factor within the parameter table. A motor speed control device for implementing the method includes an ROM element in which signals representing a parameter table are stored and a speed sensor for determining whether the motor speed exceeds a predetermined value or is below a certain value and for applying an appropriate duty factor accordingly.

5 Claims, 5 Drawing Sheets

METHOD FOR CONTROLLING SPEED OF A MOTOR OF A CARD READER

This application is a continuation of application Ser. No. 07/616,057, filed Nov. 20, 1990, now abandoned.

BACKGROUND OF THE INVENTION

1. Field of the Invention

The present invention relates to a method for controlling the speed of a motor.

2. Description of the Prior Art

Conventionally, in the control of speed of a motor used as drive means for an apparatus equipped with a CPU as a mechanical controller, generally, its control system comprises a digital control for reasons of cost and to achieve actual location of an object. Control is performed by the CPU which functions as a mechanical controller.

However, in such a system for the control of speed of the motor as described, it is necessary to extremely shorten the calculation time required for controlling location of an object in order to perform real time control with the same timing as mechanical control.

Therefore, when all controls from start to stoppage of the motor are subjected to full-time closed loop control by the CPU while also using the CPU as the aforementioned mechanical controller, substantial calculation time is required and the load on the CPU is increased.

In view of the foregoing, the present inventor has proposed a simpler control method for a motor, a unique control method in which, by use of a DC motor, loads (such as calculation time) of a CPU of a controller can be relieved and a control program can be simplified without using a large and expensive motor such as a pulse motor or a servo motor.

SUMMARY OF THE INVENTION

According to the present invention, there is provided a method for controlling a motor for a movable body driving device which can stop, at a predetermined stop position, a movable body moving at a predetermined constant speed. This is done by reducing the rotational speed of the motor without control prior to the stoppage of the movable body, and then stopping the motor without control at the time immediately before the stop position within the range of movement of the movable body caused by inertia.

That is, according to the aforesaid method for controlling a motor, in locating the movable body, operation at the time of reduction and stoppage of the motor can be made without control, and the motor can be driven by digital control without full-time closed loop control, thus reducing the burden on the CPU.

Furthermore, since in locating the movable body, control can be controlless, shortening of calculation time in the case of real time control during the same period as the mechanical control by the CPU as a mechanical controller and reduction in burden on the CPU can be attained. Control of the motor, furthermore, can be accomplished without the use of a high-speed CPU.

It is to be noted that, in the control method for performing the locating of a stop position of the motor, as in the aforementioned motor control method, it is necessary to reduce the rotational speed of the motor to so low a rotational speed that the rotational amount of the motor caused by inertia is within an allowable range of error in the stop position thereof.

However, in normal motors, when a driving system having a large variation element is controlled at a low speed, a phenomenon such as oscillation tends to occur, and the movement sometimes stops.

On the other hand, when an attempt is made to carry out accurate control in a low speed control region in order to avoid the aforesaid phenomenon, loads (such as calculation time) of the CPU of the controller increases, and the control program becomes complicated, making co-use with CPU as a mechanical controller difficult.

The present invention has been accomplished in view of the aforementioned points. An object of the present invention is to provide a method for controlling a speed of a motor which can maintain a motor speed within a preset speed range and which can simplify a control program and shorten calculation time.

For solving the aforesaid problems, the present invention provides a method comprising setting an upper limit threshold level for the thresholding at an upper limit value of the set range speed and a lower limit threshold level for the thresholding at a lower limit value of said set speed range, providing a parameter table having a plurality of different duty factors for stepwisely adjusting the speed of the motor whereby when the speed of the motor exceeds the upper limit value, an input of the motor is switched to a lower rank of duty factor within the parameter table, whereas when the speed of the motor lowers to below said lower limit value, an input of the motor is switched to a higher rank of duty factor within the parameter table.

According to the present invention, when the speed of the motor exceeds the upper limit value of a preset speed range, an input of the motor is switched to a lower rank of duty factor within the parameter table whereas when the speed of the motor lowers below the lower limit value in the set speed range, an input of the motor is switched to a higher rank of duty factor within the parameter table. Therefore, the speed of the motor is controlled so that it is always maintained within its set speed range.

For a better understanding of the present invention, reference is made to the following description and accompanying drawings while the scope of the invention will be pointed out in the appended claims.

DETAILED DESCRIPTION OF THE INVENTION AND PREFERRED EMBODIMENTS a) First Approach of the Inventor

For the purpose of clarifying the present invention, a method for controlling a motor previously proposed by the present inventor will be first described.

This method for controlling a motor is applied to a motor as a drive source of a movable body driving device whose movable body comprises a prepaid card known, for example, as a telephone card, a railroad fare card, etc., as shown in FIGS. 3 to 7.

Figure 3:
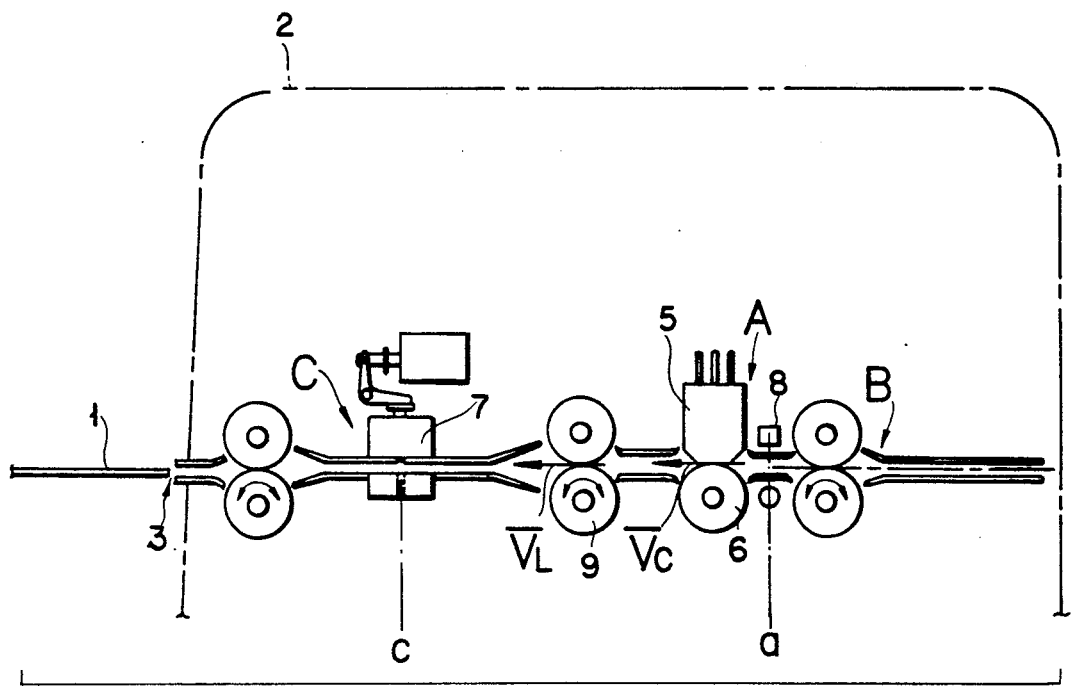
FIG. 3 is a schematically depicted sectional view of a movable body driving device to which the present invention is applied.

In FIG. 3, a movable body, i.e., a card is inserted into the apparatus body 2 through a card insert inlet 3 provided in the body 2, as is known.

The card 1 inserted into the apparatus body, which first includes a record- and reproducing portion A having a magnetic head 5.

In the record- and producing portion A, the card 1 is moved at a predetermined processing speed (steady-state speed Vc) between the magnetic head 5 and a pinch roller 6. The magnetic head 5 reproduces, records and renews (hereinafter referred to as R/W) items of information such as the remaining number, using frequency and so on recorded in the card 1. However, information is not reproduced during forward movement of the card 1.

Next, the card 1 having reproduced information is carried forward to a switch back carrier portion B where it will remain for a period of time in a standby condition. During this standby condition of the card 1, operations such as conversation with the user, sales of tickets or the like are performed.

Upon termination of the aforesaid operation, the card 1, having remained in place at the switch back carrier portion B, is then moved backward.

During the backward movement of the card 1, the card 1 is again moved at a predetermined speed (steady-state speed Vc) between the magnetic head 5 and the pinch roller 6, and recording of items of information, such as the remaining number, using frequency and so on, is carried out by the magnetic head 5.

The card 1 having finished R/W as mentioned above is carried to a boring portion C at which a piercer 7 is arranged.

Figure 4:
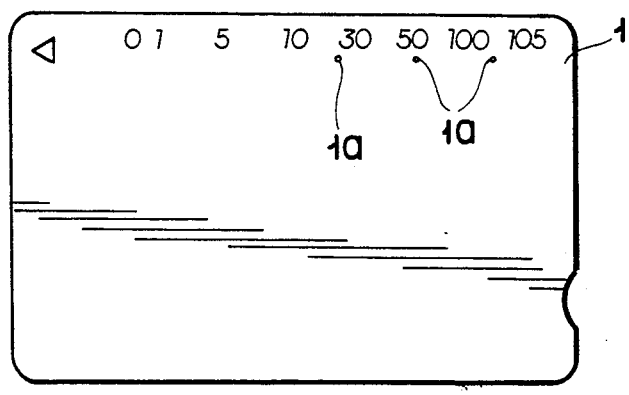
FIG. 4 is a plan view of a movable body in the movable body driving device of FIG. 3.

In the boring portion C, a punch hole 1a indicating the using state of the card 1 is bored, as is known (see FIG. 4).

In boring the punch hole 1a, in FIG. 3, the time (a) at which the moving end of the card 1 is detected by a reference sensor 8 is used as a reference position for determining the feed amount of the card 1, and the card 1 is fed by a feed roller 9 during a period from said reference position to the time (c) at which a position of the card 1 to be bored reaches the boring position of the piercer 7, after which rotation of the feed roller 9 is stopped to stop the card 1 in the state where the position of the card 1 to be bored corresponds to a predetermined stop position (boring position).

The card having stopped at this predetermined position, is bored with the punch hole 1a by the piercer 7, and thereafter the card is discharged through the card insert inlet 3 (or a card outlet provided separately from the card insert inlet 3).

Figure 5:
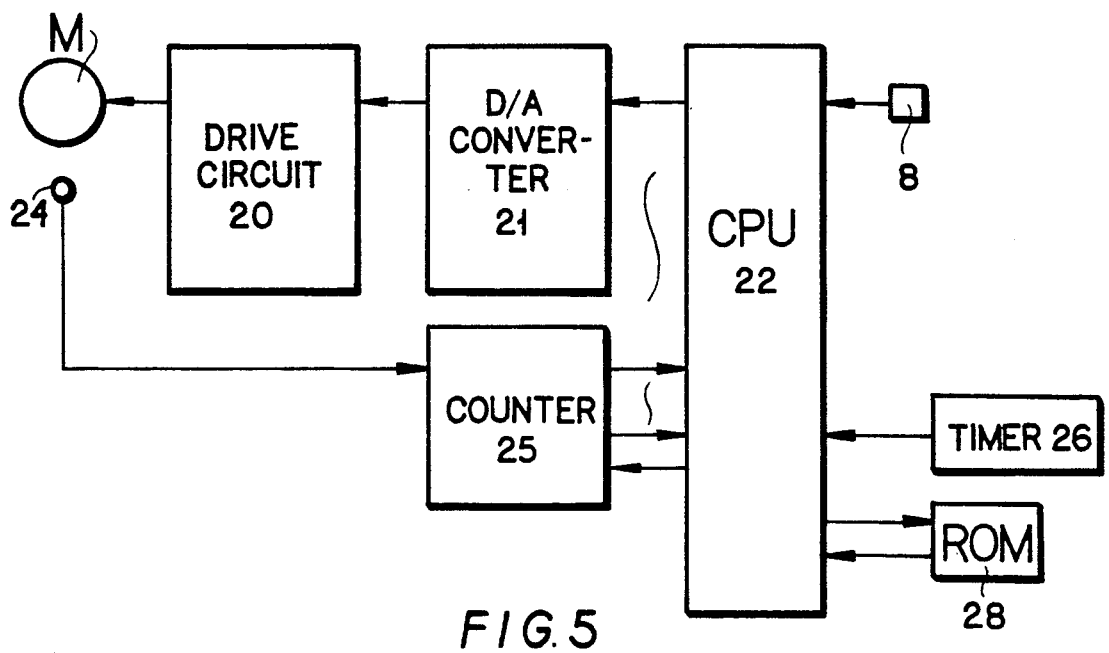
FIG. 5 is a block diagram of a drive control means for the movable body driving device.

On the other hand, a motor M for driving the card 1 as mentioned above is connected to a CPU 22 of a movable body driving device through a driver comprising a drive circuit 20 and a DA converter 21 as shown in FIG. 5.

Rotational direction, rotational speed and speed of the motor M are digitally controlled on the basis of the output of an encoder 24.

More specifically, the speed or the like of the motor M is digitally controlled by measuring a pulse signal provided as an output from the encoder 24 per unit time through a counter 25 and a timer 26 connected to the CPU 22.

An output signal of a reference sensor 8 shown in FIG. 3 is given to the CPU 22.

Figure 6:
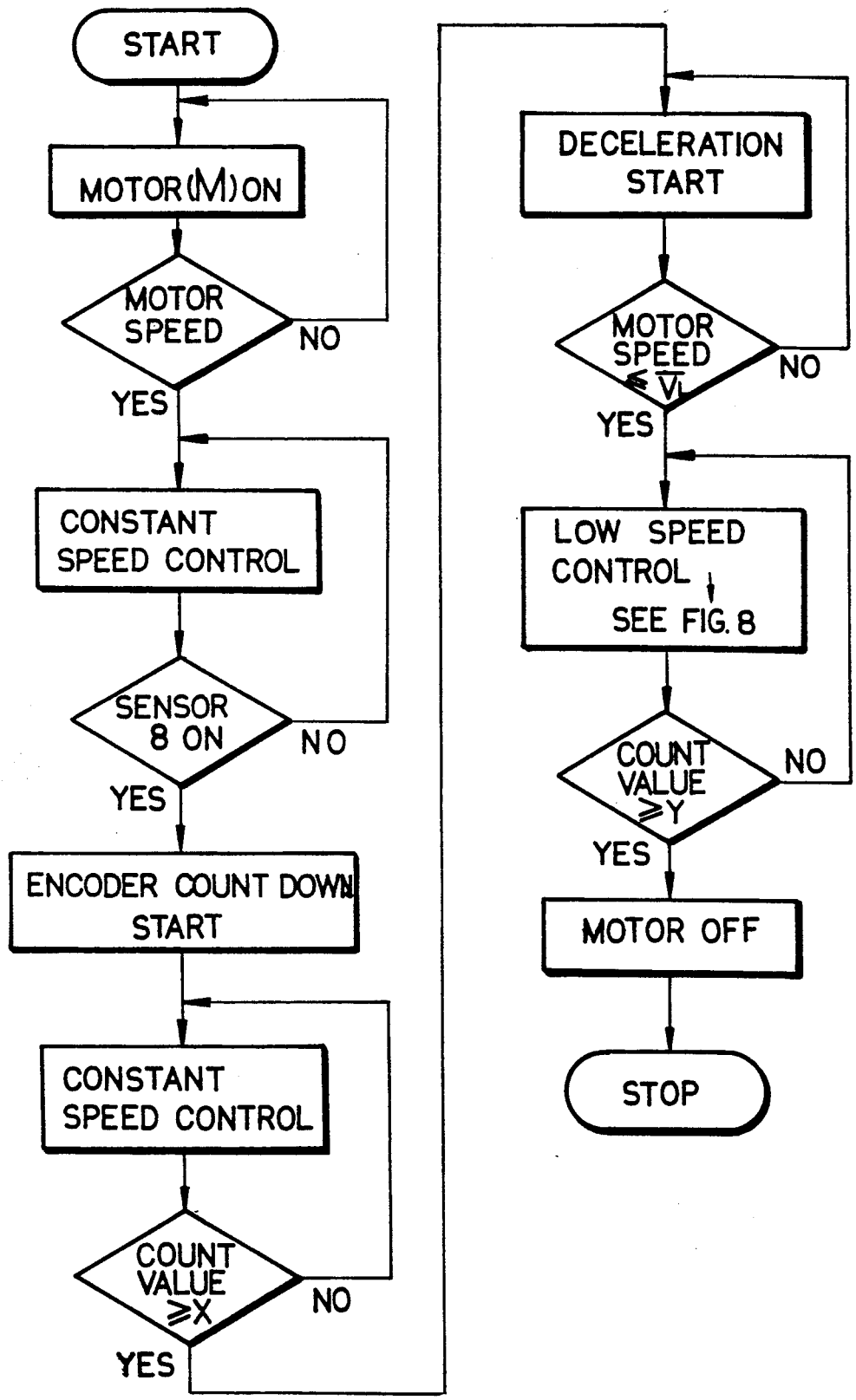
FIG. 6 is a flow chart showing the operation of the drive control means.
Figure 8:
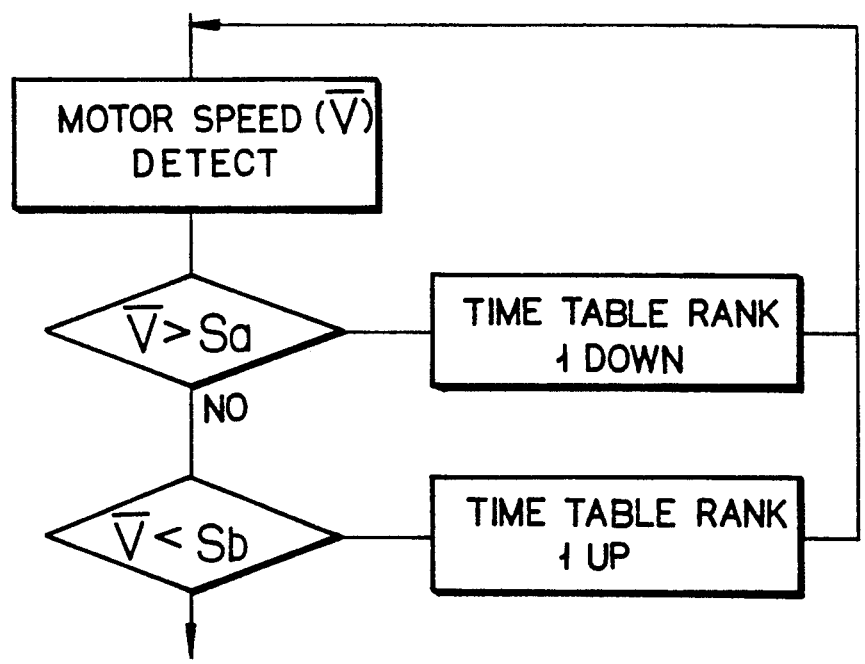
FIG. 8 is a flow chart showing the low speed control for a motor.

The motor M is driven in accordance with a program shown in FIG. 6 by drive control means as mentioned above.

This program is prestored in ROM 28 connected to the CPU 22 and starts at the time (a) at which the moving end of the card 1 is detected by the reference sensor 8.

In FIG. 6, when the program starts, the motor M is first turned on.

When the motor M is turned on, judgment is made as to whether or not the speed of the motor M reaches the steady state speed Vc.

Figure 7:
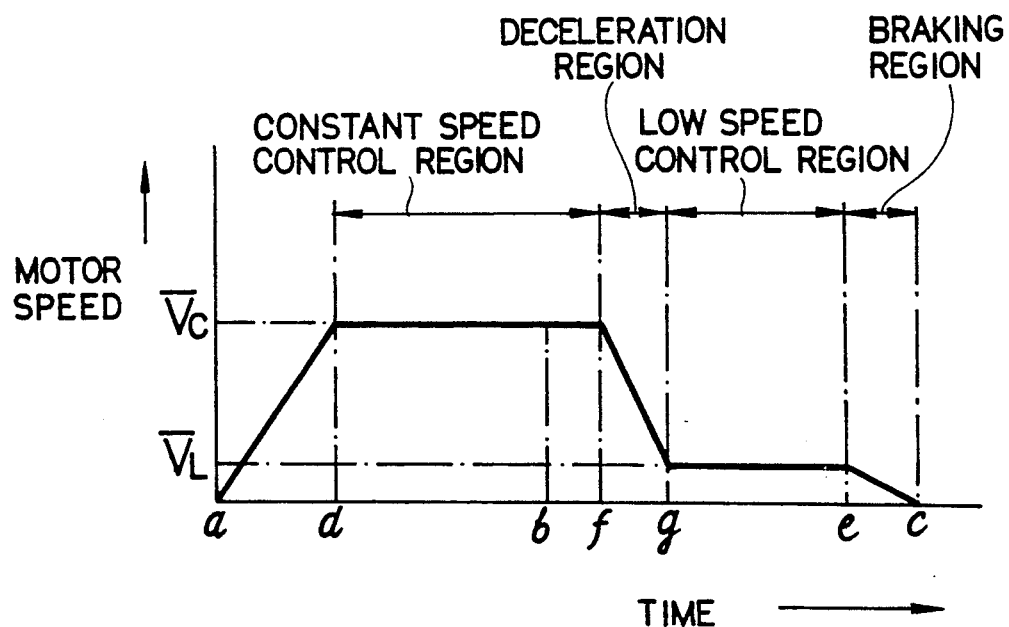
FIG. 7 is a timing chart showing the control operation of a motor in the movable body driving device.

At this time, the motor M is controlled so that it reaches a preset steady-state speed Vc during a period from the time (a) at which the moving end of the card 1 is detected by the reference sensor 8 to the time (d) at which the moving end of the card 1 reaches this side of the magnetic head 5, as shown in FIG. 7.

When the speed of the motor M reaches the steady state speed Vc, the motor M is controlled at constant speed. In this constant speed region, the R/W (here, W is recording) of information is executed by the magnetic head 5.

Next, when the moving rear end of the card 1 carried at the steady-state speed Vc arrives at the position (b in FIG. 7) crossing the reference sensor 8 in FIG. 3 and a detection signal is provided as an output from the reference sensor 8, counting of output pulses of the encoder 24 is started by a counter 25 in order to measure the sum of the distance from the point (b) at which the moving rear end of the card 1 is detected by the reference sensor 8 to the time (point f) at which the moving rear end of the card 1 passes through the magnetic head 5 and the distance from the position of the card 1 to be bored at which the moving rear end of the card 1 is positioned at the point f to the stop target position (point c) of the card 1 at which the punch hole 1a is bored. In this example, however, the difference between e and c in FIG. 7 is preset, and in actual operation, output pulses of the encoder 24 are counted until the position of the card 1 to be bored arrives at the point e.

When the counted value of output pulses of the encoder 24 resulting from the rotation of the motor M controlled at the steady-state speed Vc arrives at the time (point f in FIG. 7) of a preset counted value X, the reduction of the speed of the motor M is started.

The time for completion of reduction of the speed of the motor M, that is, the point g in FIG. 7 is the time at which the motor M is reduced in speed to the rotational speed $V_L$ at which the moving amount caused by inertia of the card 1 is within the allowable range of error in the stop position, and it is set to the timing capable of securing a sufficient low speed control region of the motor M as shown in FIG. 7.

Here, the inertia of the card 1 includes the inertia of the motor M itself and also that of the card drive means such as the feed roller 9 for the card 1 and the like.

By monitoring the output of the encoder 24, the motor M is controlled to have a low speed at the time (point g) at which the motor M is reduced to the rotational speed $V_L$. The control in the low speed control region may be somewhat rough since no problem is encountered even if jitter is somewhat large.

An object of the low speed control of the motor M is to further simplify the control for stopping the position of the card 1 to be bored at the stop target position (point c).

That is, generally, methods for stopping the position of the card 1 to be bored at the stop target position (point c) include:

(1) By measuring the distance between the present position and the stop position until the time when the card 1 reaches the stop position, adequate control is continuously provided to the motor M.

(2) The movement of the card 1 is stopped prior to arriving at the stop position, and the card 1 is then corrected and moved at an extremely low speed (step operation may be employed) through the remaining distance until the stop position is reached.

(3) The DC motor is step-operated.

However, in the above method (1), large burden is applied to the software for the CPU. In the above method (2), it takes a long time to reach the target point from the time at which the motor M is once stopped and it is therefore necessary to control the motor at an extremely low speed. Consequently, there is an added restriction imposed in that a motor having a detent torque is selected to provide adequate control according to the frequency of the encoder. This results in an increase of the burden on the CPU. In the above method (3), a restriction similar to that mentioned concerning method (2) occurs.

On the other hand, according to this control method, as mentioned above, the motor M speed is reduced without control prior to the stoppage thereof until the rotational speed $V_L$ at which the rotational amount of the motor M caused by inertia is within the allowable range of error in the stop position, and the rotation of the motor 1 is stopped without control as will be mentioned hereinafter. Therefore, a burden is not applied to the CPU, and the card i is easily stopped at the target position.

This is, in this control method, the motor M is stopped at the time (point e in FIG. 7) at which the position of the card 1 to be bored reaches the position this side of (prior to) the stop target position (point c) as the target. As a method for actually stopping the motor M, any known method can be used, for example, a method in which the motor M is deenergized or a method in which both poles of the motor M is shunt.

Thereby, a load during the rotation of the motor M (in the illustrated example, a holding pressure of the card 1 of the feed roller 9 in FIG. 3) and a current of a counter electromotive force at the time of shunt is converted into Joule heat whereby kinetic energy thereof is absorbed. Thus, the motor M is stopped by virtue of braking applied according to the magnitude of the load.

As will be apparent herein, the smaller the kinetic energy of the drive system immediately before the braking, the shorter the rotational amount of the motor M caused by the inertia of the drive system after the braking, that is, the braking distance from the braking to the stoppage.

Furthermore, the shorter the braking distance, the lesser the degree of irregularity in the stop position of the card 1.

Accordingly, in the movable body driving apparatus, the kinetic energy of the drive system immediately before the braking, namely, the rotational speed immediately before the braking of the motor M proportional to the kinetic energy is reduced to the rotational speed $V_L$ so as not to depart from the allowable range of irregularity of the stop position of the card prior to the stoppage thereof. Therefore, the card 1 can be easily stopped at the target position.

It should be noted, as mentioned above, in order to hold the over-run of the card 1 between the e and c in FIG. 7 within the specific range of accuracy, it is necessary to maintain the speed when the motor 1 stops so that the moving amount of the card 1 caused by inertia assumes the rotational speed $V_L$ within the allowable range of error in stop position.

However, in the low speed control region for controlling the drive system whose variation element is large at low speed, a phenomenon such as oscillation tends to occur in the motor M previously mentioned.

Therefore, an attempt is made to carry out accurate control in the low speed control region, and the burden (such as calculation time) on the calculation section at the time of control increases so as to make the co-use with CPU as a mechanical controller difficult.

b) Improved Approach of the Present Invention

The present invention in view of the above difficulties, achieves such speed control of the motor in which simplification of the programming and the reduction in calculation time are attained and in which the overrun of the motor is held within the specific range of accuracy so that control can be easily made by the CPU in combination with the mechanical controller by the method to be described below.

Figures 1, 2:
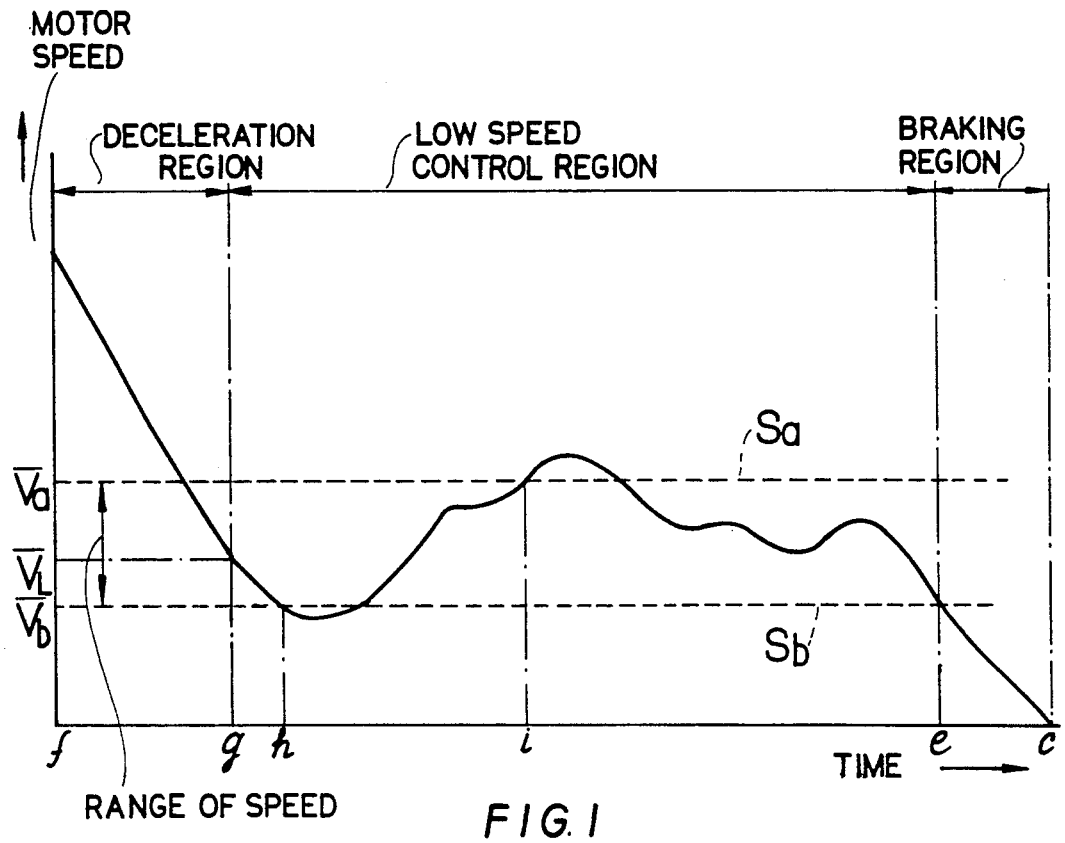
FIG. 1 is a timing chart showing the speed control operation of a motor according to the present invention.
FIG. 2 is a table showing, as a ranked parameter, a tabulation of duty factors for the speed control.

That is, according to the method for controlling the speed of the motor of the present invention, first, in the case where as shown in FIG. 1, the range of allowable error of the rotational speed of the motor 1 in the low speed control region (between g to e) is set to be from Va to Vb, an upper limit threshold level Sa for the thresholding at the upper limit value Va of the speed in the set range and a lower limit threshold level Sb for the thresholding at the lower limit value Vb of the speed in the set range are set so as to define the set speed range.

Furthermore, in the drive control means of the motor M (for example, ROM 28 in FIG. 5) a parameter table is prestored having a plurality of different duty factors for adjusting the speed of the motor M in a step-wise manner as shown in FIG. 2.

In the present embodiment, the low speed control of the motor M is started when the speed of the motor in FIG. 1 assumes a preset rotational speed $V_L$ (the speed at the aforementioned point g; hereinafter referred to as the switch level speed), and the motor M is controlled in speed as follows:

The actual speed of the motor M at the point g is not always the speed Va to Vb, i.e., within the range of allowable error, depending on the manner of speed reduction in the speed reduction region. That is, in the case where the reduction is further made during a period from the speed $V_L$ at the point g to the actual low speed control, the thus reduced speed may be between the upper limit value Va and the lower limit value Vb, and the following relation sometimes occurs:

$$V_L > V_a$$

First, at the time when the speed of the motor M arrives at the switch level speed $V_L$, the control speed of the motor M takes a value of duty factor (30%) in rank 0 in FIG. 2.

This value of duty factor (30%) in rank 0 is the value (referred to as a reference value so as to be a control reference of the motor M preset by experimental or theoretical estimation or the like.

At this time, the speed of the motor M, using the substituted reference value, is sometimes a speed lower than the target value depending on the conditions of a difference in quality of motor and load condition of the motor, and, conversely, sometimes is too slow.

In view of the above, the upper limit threshold level Sa for the thresholding at the upper limit value Va of the speed in the set range of the motor M and, at the lower limit, threshold level Sb for the thresholding at the lower limit value Vb of the speed in the set range are always set to monitor the speed of the monitor M.

When the speed of the motor M exceeds the upper limit value Va of the speed in the set range, as in the point i of FIG. 1, an input of the motor is switched to a duty factor of a lower rank within the parameter table, whereas when the speed of the motor M lowers, than the lower limit value Vb of the speed in the set range, as in the point h of FIG. 1, an input of the motor M is switched to a duty factor of a higher rank within the parameter table.

That is, in the case where the speed of the motor M exceeds the upper limit threshold level Sa or the lower limit threshold level Sb within the low speed control region shown in FIG. 1, a duty factor of the input of the motor M is moved by one rank to the rank on the deceleration side or rank on the acceleration side using the value of duty factor (30%) in rank 0 in FIG. 2 as a reference value.

In the case where the speed of the motor M still exceeds the upper limit threshold level Sa or the lower limit threshold level Sb despite the fact that the duty factor of the input of the motor M is moved by one rank, the rank of the duty factor is further increased or decreased by one rank.

When the speed of the motor M is returned to the speed within the range of set speed as set by the upper limit threshold level Sa and the lower limit threshold level Sb by the switching of the rank as described above, it is moved to the rank in a direction opposite to the direction of increasing or decreasing the duty factor switched for correction of speed. This is done to offset the acceleration of the motor M resulting from the switching of the rank as mentioned above.

By repeating the aforesaid control, the speed control of the motor M in the low speed control region as shown in FIG. 7 is realized. With the point e of FIG. 1, that is, the start of the braking region of the motor M, the value of the duty factor is set to 0, that is, energization is cut off, and the drive of the motor M is stopped.

As will be apparent from the foregoing, according to this speed control method, two branch orders and read-out and subtraction and addition can be finished at one time, and therefore, the simplification of the speed control program of the motor M and the reduction in load on the CPU can be attained.

Values of the duty factors shown in FIG. 2 and the number of ranks merely show one example in the case where the aforementioned movable body driving device is applied to the present invention, and may be suitably set according to the conditions of a difference in quality of motor and load condition of the motor.

While in the above-described embodiment, the speed of the motor is controlled in two stages of speed in order to stop the movable body at a predetermined position, it is to be noted that the speed control method of the present invention is not limited to the mere control as shown in the present embodiment. Further, the co-use with the CPU of the mechanical controller is a mere example and is not limited thereto.

Moreover, while in the above-described embodiment, the speed control of the motor is carried out by moving various values and ranks of the duty factors set on the basis of the experiments or the like, it is to be noted that as the control system of the motor, a proportional control system may be employed in which a deviation from the target value of the motor speed is monitored, and various values and ranks of the duty factors proportional to the deviation are moved to effect the speed control of the motor.

In the case of this proportional control system, for the calculation at the time of control, two additions and subtractions, one multiplication and one read-out from the parameter table will suffice, and therefore, the simplification of the control program of the motor and the reduction in load of the CPU can be attained in a manner similar to that of the aforementioned embodiment.

Furthermore, values fed back from the parameter table can be widely scattered values despite the fact that the control program of the motor is simple. Therefore, instant responsiveness during the control can be enhanced, and characteristics more than mere proportional control can be provided depending on how a parameter table is prepared.

According to the present invention, the speed control program of the motor can be simplified and the load of the CPU can be reduced.

While the foregoing description and drawings represent the preferred embodiments of the present invention, it will be obvious to those skilled in the art that various changes and modifications may be made therein without departing from the true spirit and scope of the present invention.

What is claimed is:

1. In a method for controlling a speed of a motor, of a driving device in a card reader, the method comprising the steps of:
   setting an upper limit threshold level for the thresholding at an upper limit value of a set speed range and a lower limit threshold level for the thresholding at a lower limit value of said set speed range, providing a signal based on a parameter table having a plurality of different duty factors for stepwisely adjusting the speed of said motor so that when the speed of said motor exceeds said upper limit value, an input of the motor is switched to a signal of a lower rank of duty factor within said parameter table, whereas when the speed of said motor lowers to a speed below said lower limit value, an input of the motor is switched to a signal having a higher rank of duty factor within said parameter table.

2. The method for controlling a speed of a motor according to claim 1, including the steps of monitoring a deviation from a target value of the motor speed, and applying to the motor a signal having values and ranks of such duty factors proportional to said deviation to control the speed of the motor.

3. The method of claim 1 or claim 2 wherein the signal for stepwisely adjusting the speed of the motor is based on a parameter table having a list of rank and duty factor as follows:

| rank | duty factor |
|------|-------------|
| −3   | 5%          |
| −2   | 10%         |
| −1   | 20%         |
| 0    | 30%         |
| 1    | 40%         |
| 2    | 50%         |
| 3    | 70%         |

4. In a method for controlling a motor for a card driving device in a card reader capable of stopping a card moving at a predetermined constant speed at a predetermined stop position, said method including reducing the rotational speed of the motor prior to stoppage of the body and then stopping the motor at a time immediately before a stop position, said reduction of rotational speed taking into account a range of movement of the body caused by inertia, the improvement comprising:

controlling the speed of the motor during the speed reducing step by establishing a set speed range of the motor which includes an upper limit value and a lower limit value;

sensing, as an upper limit threshold, when the motor speed exceeds said upper limit value and, as a lower limit threshold, when the motor speed drops below said lower limit value; and providing a speed correction signal to said motor based on a parameter table having a plurality of different duty factors for stepwisely adjusting the speed of the motor so that, when the speed of the motor exceeds the upper limit threshold, an input of the motor is switched to a signal of a lower rank of duty factor within said parameter table and when the speed of the motor drops below the lower limit threshold, an input of the motor is switched to a signal having a higher rank of duty factor within said parameter table.

5. In a card reader having a driving device with a motor for moving a card at a constant speed and for stopping said card when it is moving at a predetermined constant speed, at a predetermined stop position, said driving device including a CPU, the improvement comprising motor speed control means including:

an ROM element in which signals representing a parameter table are stored, said parameter table having a plurality of ranked duty factors for operation of said motor; and means for sensing the speed of the motor to determine whether the motor speed exceeds a predetermined upper speed value and, when it exceeds said value, for applying a signal from information stored in said ROM element having a duty factor of lower rank to said motor selected from aid table to lower the speed of said motor, and to determine whether the motor speed is below a predetermined lower speed value and, when it is below said value, for applying a signal having a duty factor of higher rank to said motor to raise the speed of said motor; whereby the speed of the motor can be controlled between the upper speed value and lower speed value without excessively burdening the CPU.

* * * * *